Dec. 11, 1923.
T. PARKER
AUTO STEERING WHEEL
Filed May 16, 1922
1,477,001
3 Sheets-Sheet 1
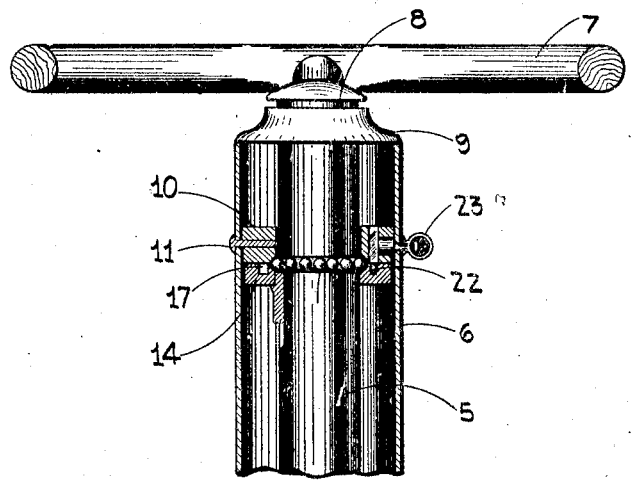
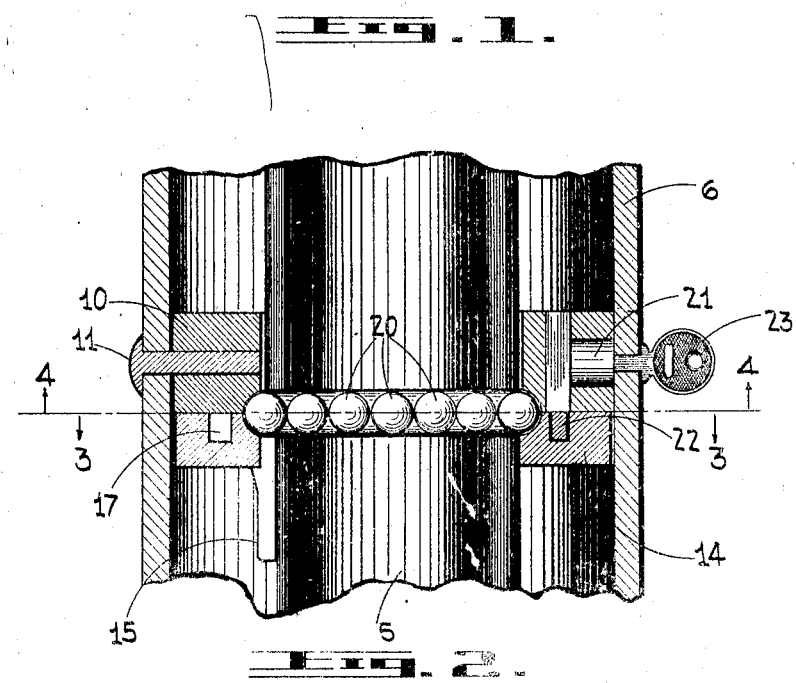
INVENTOR
THOMAS PARKER.
BY *E. F. Bond*
ATTORNEY Dec. 11, 1923.

T. PARKER

AUTO STEERING WHEEL

Filed May 16, 1922

INVENTOR
THOMAS PARKER.
BY E. H. Bond
ATTORNEY

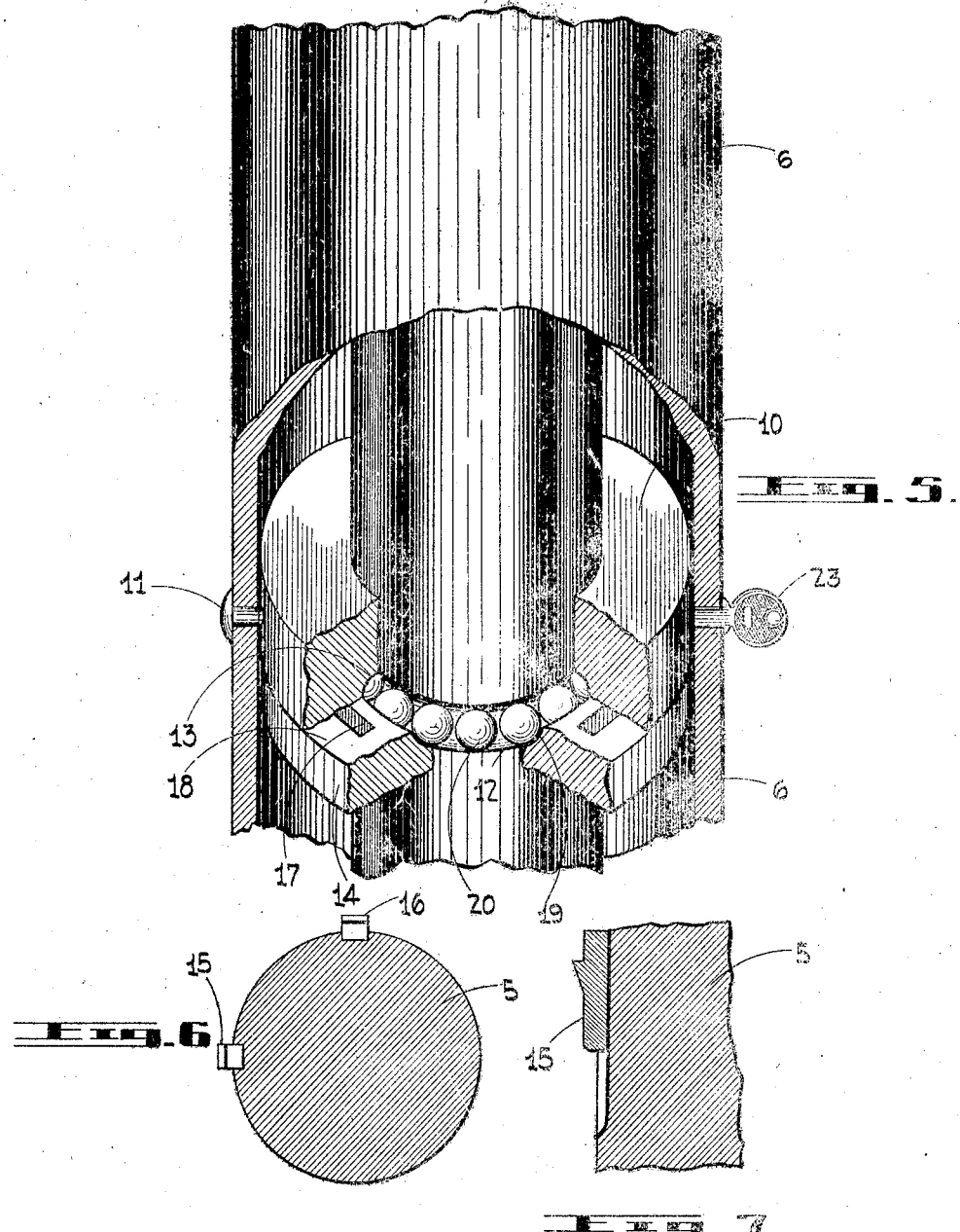

Patented Dec. 11, 1923.

1,477,001

UNITED STATES PATENT OFFICE.

THOMAS PARKER, OF TORONTO, ONTARIO, CANADA.

AUTO STEERING WHEEL.

Application filed May 16, 1922. Serial No. 561,358.

*To all whom it may concern:*

Be it known that I, THOMAS PARKER, a citizen of the Dominion of Canada, residing at Toronto, in the county of York and Province of Ontario, Canada, have invented certain new and useful Improvements in Auto Steering Wheels, of which the following is a specification.

The present invention relates to automobile locks and more particularly pertains to that type of device, adapted for attachment to the steering column for locking the steering rod against movement to prevent the unauthorized operation of the automobile.

The principal object of the invention is to provide a device of the character described that is capable of preventing the steering of the automobile, when an attempt of theft is intended.

With these and other objects in view, the invention consists in the construction, combination and arrangement of parts as will be hereinafter fully described, illustrated in the accompanying drawings, and pointed out in the claim hereunto appended.

Figure 1 is a vertical section through the steering column and wheel, and illustrating the locking elements.

Fig. 2 is a magnified fragmental section of the steering column and rod and the locking elements.

Fig. 5 is a magnified elevation of the steering column, with a portion broken away and in section, illustrating more fully the locking elements.

Fig. 6 is a horizontal section through the steering rod, illustrating two ring retaining keys, and Fig. 7 is a horizontal section, a longitudinal view of the keys.

Referring to the drawings like numerals designate like parts in the various drawings.

Figure 3:
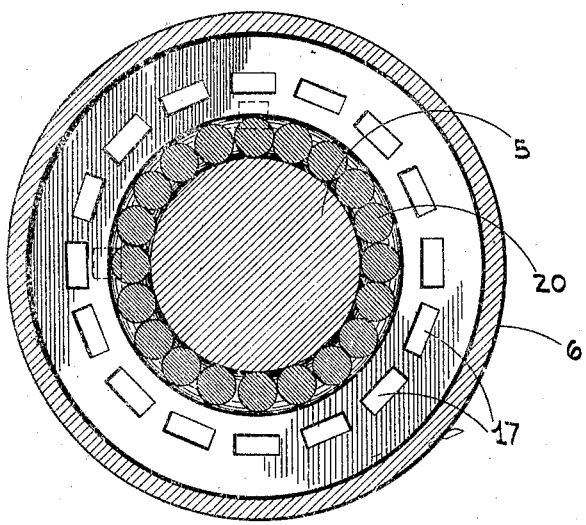
Fig. 3 is a section on line 3—3 of Fig. 2.
Figure 4:
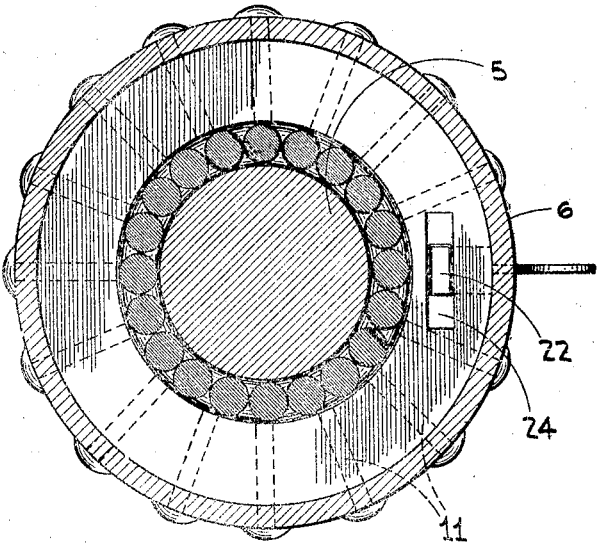
Fig. 4 is a section on line 4—4 of Fig 2 looking in the direction of the arrows.

For the prevention of the unauthorized use or the theft of motor vehicles various devices have been resorted to more particularly the control of the ignition and differential and expensive combination, locks attached to both the steering mechanism and the dash.

To obviate the objections stated and for locking the steering rod against any extensive movement, or in other words, movement in such manner to permit the proper steering of the machine, I have provided the novel attachment, which will now be described.

The numeral 5 designates the steering rod, which latter is encased in the usual manner in a column 6. A steering wheel 7 is connected to the upper end of the rod 5 by an extension 8 which latter has bearings upon a cap 9, secured to the upper open end of the column 6.

The steering rod 5 is connected at its base to the mechanism controlling the steering of the vehicle and the column 6 is connected in the ordinary manner to the floor.

A ring member 10 is arranged within the upper end of the tubular column 6 and is held in position by a series of bolts 11. This ring member 10 is formed with a central opening, through which extends the steering rod 5. The rod 5 is provided with an annular channel 12 and likewise the inner lower edge of the ring member 10 is formed with an arcuate channel 13. A flat ring member 14 is secured to the steering rod 5 by the keys 15 and 16 and revolves therewith when the said rod and steering wheel are actuated. Ring 14 is formed with a plurality of radially disposed recesses 17 arranged in spaced relation upon the upper face 18 thereof. The ring member 14 is formed with an arcuate channel 19 and a plurality of ball bearings 20, are located in the channel 12 of the steering rod 5 and this channel 12, together with the arcuate channels 13 and 19 of the rings 10 and 14, form a ball race.

The ring member 10 is formed with a transverse opening in which is mounted the tubular casing 21 of a lock of the "Yale" pattern. A plunger 22 is connected to the operative mechanism of the lock and the column 6 is formed with a key-hole through which may be passed a key 23, for actuating the lock mechanism.

The plunger 22 is disposed in a slot 24 in the ring member 10 and is adapted for insertion into any of the recesses 17 of ring member 14, when the key is turned to lock the steering rod 5 against movement.

As the ring member 14 is keyed upon the steering rod 5 and the ring member 10 is secured to the column 6, when the plunger 22 is inserted into the ring slot 24, the steering rod 5 can only be slightly revolved.

This slight movement referred to, is necessary to comply with various city ordinances, requiring the moving of the car from the curb in case of fire and to allow the street cleaners, the right of way.

By the provision of the ball bearings 20, the even operation of the steering rod 5 is assured.

From the foregoing it is thought that the construction of my invention will be clearly understood, and, therefore, a more extended explanation has been omitted.

What I claim as new is:

The combination with an automobile steering rod and column, of two ring members attached to the said rod and column, respectively, recesses formed in the steering rod ring member, an opening formed in the column ring member, a groove formed on said steering rod, channels provided on said rings, ball bearings arranged in the said groove, the said ball bearings adapted for movement in said steering rod groove and the channels of said rings, a lock arranged in said column ring member, a plunger bolt connected to said lock, and said bolt adapted for actuation through a key into said lock, for entering one of the recesses in the steering rod ring.

In testimony whereof I affix my signature in the presence of two witnesses.

THOMAS PARKER.

Witnesses:
C. ORBUCH,
C. M. MACDONALD.